United States Patent [19]

Tang et al.

[11] Patent Number: 5,296,627
[45] Date of Patent: Mar. 22, 1994

[54] ETHYLENICALLY UNSATURATED POLY(ALKYLENEOXY) SURFACTANTS

[75] Inventors: Robert H. Tang, Murrysville; Paritosh M. Chakrabarti, Pittsburgh, both of Pa.

[73] Assignee: PPG Industries, Inc., Pittsburgh, Pa.

[21] Appl. No.: 985,780

[22] Filed: Dec. 4, 1992

Related U.S. Application Data

[63] Continuation-in-part of Ser. No. 974,035, Nov. 10, 1992, abandoned, which is a continuation of Ser. No. 722,423, Jun. 27, 1991, Pat. No. 5,162,475, which is a continuation-in-part of Ser. No. 625,321, Dec. 10, 1990, abandoned, which is a continuation-in-part of Ser. No. 552,355, Jul. 12, 1990, abandoned, which is a continuation of Ser. No. 436,968, Nov. 15, 1989, abandoned, which is a continuation of Ser. No. 209,249, Jun. 20, 1988, abandoned.

[51] Int. Cl.$^5$ .................. C07C 43/04; C07C 43/15; C07C 211/03; C07C 305/04
[52] U.S. Cl. .................. 558/34; 558/51; 568/614
[58] Field of Search .................. 558/34, 51; 568/614

[56] References Cited

U.S. PATENT DOCUMENTS

| | | | |
|---|---|---|---|
| 2,601,256 | 6/1952 | Bruson et al. | 260/79.3 |
| 2,677,700 | 5/1954 | Jackson et al. | 260/488 |
| 2,996,538 | 8/1961 | Van Dijk et al. | 260/186 |
| 3,243,455 | 3/1966 | Pizzini et al. | 260/513 |
| 3,839,393 | 10/1974 | Steckler | 260/458 |
| 3,857,211 | 4/1975 | Steckler | 260/486 B |
| 3,875,202 | 4/1975 | Steckler | 260/458 |
| 3,941,857 | 3/1976 | Wu | 260/837 PV |
| 4,049,608 | 9/1977 | Steckler et al. | 260/29.6 SQ |
| 4,222,957 | 9/1980 | Watts, Jr. et al. | 260/512 R |
| 4,224,455 | 9/1980 | Deutsch | 560/193 |
| 4,246,387 | 1/1981 | Deutsch | 526/209 |
| 4,337,185 | 6/1982 | Wessling et al. | 524/458 |
| 4,357,441 | 11/1982 | Hamamura et al. | 524/591 |
| 4,426,489 | 1/1984 | Wessling et al. | 524/815 |
| 4,436,672 | 3/1984 | Naylor | 260/512 R |
| 4,467,073 | 8/1984 | Creasy | 525/127 |
| 4,582,137 | 4/1986 | Schmitt | 166/270 |
| 4,600,761 | 7/1986 | Ruffner et al. | 526/270 |
| 4,612,142 | 9/1986 | Piörr et al. | 252/555 |
| 4,618,457 | 10/1986 | Esselborn et al. | 260/504 R |
| 4,792,419 | 12/1988 | Piorr et al. | 260/513 R |
| 4,797,223 | 1/1989 | Amick et al. | 252/174.23 |
| 4,814,514 | 3/1989 | Yokota et al. | 558/34 X |
| 4,870,120 | 9/1989 | Tsubakimoto et al. | 524/5 |
| 4,879,399 | 11/1989 | Latella et al. | 558/34 |
| 4,975,209 | 12/1990 | Welch | 252/8.6 |

FOREIGN PATENT DOCUMENTS

| | | |
|---|---|---|
| 011806A1 | 6/1980 | European Pat. Off. |
| 084227A1 | 7/1983 | European Pat. Off. |
| 0102707A1 | 3/1984 | European Pat. Off. |
| 0107300A1 | 5/1984 | European Pat. Off. |
| 0216479A1 | 4/1987 | European Pat. Off. |

*Primary Examiner*—Marianne M. Cintins
*Assistant Examiner*—Michael B. Hydorn
*Attorney, Agent, or Firm*—Irwin M. Stein

[57] ABSTRACT

Describes terminally ethylenically unsaturated poly(alkyleneoxy) surfactant compounds of the general formula, $R-O-(R'O)_m-(EO)_{n-1}-CH_2CH_2-X$, wherein R is the ethylenically unsaturated hydrocarbon group, e.g., allyl, R' is the bivalent radical derived from butylene oxide, E is the bivalent ethylene radical, m and n are numbers of from 10 to 15 and 10 to 40 respectively, and X is chloride, tertiaryamino, sulfonate, sulfate, phosphate, isethionate and alkali metal salts of the anionic groups. These surfactant compounds may be used in emulsion polymerization of ethylenically unsaturated, e.g., vinyl, monomers.

11 Claims, No Drawings

ETHYLENICALLY UNSATURATED POLY(ALKYLENEOXY) SURFACTANTS

This application is a continuation-in-part of application Ser. No. 07/974,035, filed Nov. 10, 1992 (now abandoned), which is a continuation of application Ser. No. 07/722,423, filed Jun. 27, 1991, now U.S. Pat. No. 5,162,475, which is a continuation-in-part of application Ser. No. 07/625,321, filed Dec. 10, 1990 (now abandoned), which is a continuation-in-part of application Ser. No. 07/552,355, filed Jul. 12, 1990 (now abandoned), which is a continuation of application Ser. No. 07/436,968, filed Nov. 15, 1989 (now abandoned), which is a continuation of application Ser. No. 07/209,249, filed Jun. 20, 1988 (now abandoned).

DESCRIPTION OF THE INVENTION

In the emulsion (suspension) polymerization of ethylenically unsaturated monomers, one or more surfactants (or emulsifiers) are employed conventionally to emulsify the monomer reactant(s) and the resulting polymer product latex. Such surfactants do not become chemically bonded to the polymer product by carbon to carbon bonding (as distinct from a physical mixture, being adsorbed on the polymer product or the like). It has been suggested that the small amount of surfactant which remains in the polymer product latex may interfere with performance of products, e.g., coatings and adhesives, prepared from such latex. U.S. Pat. No. 3,941,857 reports that coatings prepared from vinyl chloride/olefin copolymers show inconsistent performance in hot water resistance and tend to be sensitive to water in that pitting or "blushing" (a whitening effect) may sporadically occur, particularly after exposure of the coating to boiling water for extended periods. Such a performance characteristic is detrimental to certain end uses for such copolymers, e.g., container and paper coatings, interior and exterior coatings, industrial coatings, automotive coatings and certain adhesives.

Various proposals have been made for avoiding the reported adverse effects of surfactant residues in emulsion polymerized polymers. U.S. Pat. No. 3,941,857 describes incorporating a small amount of an epoxy resin with a vinyl chloride/olefin copolymer resin before casting a film from the resin. U.S. Pat. No. 4,049,608 describes the use of esters of an alkenoic acid selected from the group consisting of cinnamic acid and alkenoic acids of from 4 to 18 carbon atoms with a hydroxyalkane sulfonic acid in the emulsion polymerization of vinyl and other ethylenically unsaturated monomers. These esters serve the dual function of emulsifier and co-monomer. U.S. Pat. No. 4,224,455 describes a class of ringed sulfonated half esters of maleic anhydride and alkoxylated alkyl arylols. These esters are reported to be anionic emulsifiers (surfactants) and reactive functional monomers that are copolymerizable under emulsion polymerization conditions. U.S. Pat. No. 4,337,185 describes use of a reactive polymeric surfactant which is a substantially linear synthetic water-soluble surfactant whose polymeric backbone is derived from the polymerization of one or more ethylenically unsaturated monomers and which polymeric surfactant has a number average molecular weight of from about 500 to about 40,000 and contains various functional groups.

The present invention provides a novel group of poly(alkyleneoxy) compounds having terminal olefinic unsaturation that display surfactant activity, i.e., they function as surfactants (emulsifiers) in emulsion (suspension) polymerization processes. Moreover, they are copolymerizable with ethylenically unsaturated monomers, including vinyl monomers, of the type commonly employed in emulsion polymerization processes by virtue of the reactive double bond present in the compounds. In accordance with the present invention, there is provided a novel group of compounds having a hydrophobic portion having terminal ethylenic unsaturation, and a hydrophilic portion containing a poly(alkyleneoxy) segment and an ionic (anionic, nonionic, or cationic) segment.

DETAILED DESCRIPTION OF THE INVENTION

The polymerizable surfactant compounds of the present invention may be represented by the following graphic formula:

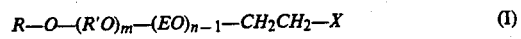

$$R-O-(R'O)_m-(EO)_{n-1}-CH_2CH_2-X \qquad (I)$$

wherein R is an organic monovalent radical having terminal olefinic (ethylenic) unsaturation. More particularly, R is an organic radical selected from the group consisting of terminally unsaturated $C_2$-$C_{18}$ alkenyl, e.g., vinyl and allyl, acrylyl, acrylyl ($C_1$-$C_{10}$) alkyl, methacrylyl, methacrylyl ($C_1$-$C_{10}$) alkyl, vinylphenyl and vinylphenylene ($C_1$-$C_6$) alkyl. More particularly, the unsaturated $C_2$-$C_{18}$ alkenyl group may be represented by the following graphic formula:

$$CH_2=CH-C_aH_{2a}- \qquad (II)$$

wherein a is a number between 0 and 16. When a is 0, the alkenyl group is vinyl, i.e., $CH_2=CH-$. When a is 1, the alkenyl group is allyl, i.e., $CH_2=CH-CH_2-$.

The acrylyl, acrylyl ($C_1$-$C_{10}$) alkyl, methacrylyl and methacrylyl ($C_1$-$C_{10}$) alkyl groups may be represented by the following graphic formula:

$$CH_2=C(R_1)-C(O)-C_bH_{2b}- \qquad (III)$$

wherein $R_1$ is hydrogen or methyl and b is a number from 0 to 10. When b is 0 and $R_1$ is hydrogen, the group is acrylyl [$CH_2=CH-C(O)-$]. When b is 0 and $R_1$ is methyl, the group is methacrylyl [$CH_2=C(CH_3)-C(O)-$]. When $R_1$ is hydrogen and b is 1, the group is acrylyl methyl [$CH_2=CH-C(O)-CH_2-$].

The vinylphenylene and vinylphenylene ($C_1$-$C_6$) alkyl groups may be represented by the following graphic formula:

$$CH_2=CH-Ar-C_dH_{2d}- \qquad (IV)$$

wherein Ar is phenylene and d is a number between 0 and 6. When d is 0, the group is vinylphenyl and when d is 1, the group is vinylphenylene methyl.

In graphic formula I, $-R'O-$ is a bivalent alkyleneoxy (substituted and a substituted) group derived from a cyclic ether other than ethylene oxide or mixture of such cyclic ethers. More particularly, $-R'O-$ may be represented by the graphic formula $-CH_2CH(R''-)-O-$, wherein R" is methyl, ethyl, phenyl, or phenyloxymethyl, $-CH_2-(CH_2)_2-CH_2-O-$, and mixtures thereof. Still more particularly, $-R'O-$ may be described as the bivalent radical derived from cyclic ethers selected from the group consisting of propylene oxide, (e.g., 1,2-epoxypropane), butylene oxide (e.g., 1,2-epoxybutane), styrene oxide [(epoxyethyl) benzene], tetrahydrofuran, phenyl glycidyl ether (1,2-epoxy-3-phenoxypropane) and mixtures thereof.

Preferably, —R'O— is the bivalent epoxy group derived from propylene oxide, butylene oxide and mixtures of propylene oxide and butylene oxide. More preferably, —R'O— is the bivalent epoxy group derived from butylene oxide. When mixtures of butylene oxide and propylene oxide are used, it is preferred that the mixture comprise greater than 50 mole percent butylene oxide, e.g., greater than about 75 to 80 mole percent butylene oxide.

The letter E in graphic formula I is the bivalent ethylene radical, and m and n are each numbers which may vary from about 5 to about 100, preferably between about 5 or 10 and about 50. More preferably, m is a number that varies from about 10 to about 15, e.g., 12 to 15, and n is a number that varies from about 10 to about 40, e.g., 15 to 35.

The ratio of m:n may vary from about 20:1 to about 1:20, preferably from about 1.5:1 to about 1:4, e.g., 1:1.25 to 1:1.5. The specific ratio of m:n used will depend on the particular polymerization system in which the polymerizable surfactant of the present invention is incorporated. Varying the ratio of m:n will vary the HLB (Hydrophilic-Lipophilic Balance) of the polymerizable surfactant compound. If the polymerization system requires a hydrophobic surfactant, m will be greater than n. Conversely, if the emulsion polymerization system requires a hydrophilic surfactant, then m will be less than n. The ratio of m:n should be chosen so that the resulting compound is capable of reducing the surface tension of water. Preferably, the surface tension of a 0.1 weight percent aqueous solution of the polymerizable surfactant compound at 25° C. is less than 38 dynes per centimeter. More preferably, the surface tension of such a solution is in the range of 30 to 35 dynes per centimeter. Surface tension may be measured by a Du Nouy tensiometer.

X in graphic formula I is selected from an ionic group consisting of hydroxyl (—OH), chloride (—Cl), sulfonate (—SO$_3$), sulfate (—OSO$_3$), monophosphate [—O—P(O)(OH)$_2$], diphosphate [—O—P(O)(OH)$_2$]$_2$, acetate (—CH$_2$—C(O)OH), isethionate (—CH$_2$—CH$_2$—SO$_3$H), and the alkali metal salts of the aforedescribed sulfonate, sulfate, phosphate, acetate and isethionate anionic groups, tertiary amino, i.e., —N(R$_2$)(R$_3$)R$_4$, wherein R$_2$, R$_3$ and R$_4$ are each selected from the group consisting of alkyl and hydroxyalkyl groups, particularly groups containing from 1 to 5 carbon atoms, e.g., a tertiary amine derived from dimethylamine, triethylamine, triethanolamine and diethylmethylamine. More particularly, X may be selected from the group consisting of sulfonate, sulfate, monophosphate (and alkali metal salts thereof), chloride and tertiaryamino. As used herein, the term "alkali metal" includes sodium, potassium, lithium and ammonium.

The polymerizable surfactant of the present invention may be prepared by reacting the precursor alcohol, ROH, wherein R is as heretofore defined with respect to graphic formula I, with the desired amount of first cyclic ether (R'O), e.g., butylene oxide, and subsequently reacting the resulting epoxy-containing product with the desired amounts of ethylene oxide (EO). The product resulting from this reaction sequence is a material corresponding to graphic formula I wherein X is hydroxyl.

Preparation of the polymerizable surfactant wherein X is sulfate may be accomplished by reacting the corresponding non-ionic (hydroxy end-capped) surfactant with chlorosulfonic acid, 100% sulfuric acid or with sulfur trioxide. See, for example, U.S. Pat. Nos. 2,143,759 and 2,106,716 of H. A. Bruson. Neutralization of the reaction product with an alkaline reagent, e.g., an alkali metal hydroxide such as sodium hydroxide, yields the corresponding salt, e.g., the sodium salt. Similarly, the corresponding non-ionic surfactant may be reacted with polyphosphoric acid (P$_2$O$_5$·2H$_2$O) or chloroacetic acid by known procedures to prepare the phosphate or acetate end-capped polymerizable surfactant.

Sulfonate terminated polymerizable surfactants of graphic formula I may be prepared by first converting the corresponding non-ionic material to the corresponding chloride by reaction with thionyl chloride or carbonyl chloride (followed by subsequent decarboxylation to the chloride) and then reacting the chloride derivative with sodium sulfite. In conducting the sulfonation reaction, the pre-formed sulfonate terminated surfactant product may be used as the reaction medium to improve conversions. Thus, from 0 to 20 weight percent (based on the total amount of reactants) of pre-formed sulfonate product may be added to the reactor.

The chloride capped surfactant may be used itself as a surfactant as well as a precursor for preparing the sulfonate, isethionate or quaternary ammonium terminated surfactant. The isethionate derivative may be prepared by reacting the chloride-capped surfactant with isethionic acid in the presence of a base, e.g., sodium hydroxide. Quaternary ammonium derivatives may be prepared by reacting the corresponding chloride with the tertiary amine, N(R$_2$)(R$_3$)R$_4$, wherein R$_2$, R$_3$ and R$_4$ are the same as defined with respect to X in graphic formula I. Processes for converting the non-ionic polymerizable surfactant to the chloride, sulfate, sulfonate, phosphate ester, acetate, isethionate or quaternary ammonium derivative are well known to the skilled chemist.

The precursor terminally ethylenically unsaturated alcohols used to prepare the polymerizable surfactant materials of graphic formula I may be prepared by methods known in the art. Some, such as allyl alcohol, are readily commercially available. In accordance with a particular embodiment of the present invention, the precursor alcohol is charged to a suitable autoclave and heated to a temperature in the range of from about 110° C. to about 130° C. Propylene oxide and/or 1,2—epoxybutane are metered into the autoclave and reacted with the unsaturated alcohol in the presence of an alkaline reagent such as sodium hydroxide. After the desired amount of propoxylation and/or butoxylation is achieved, ethylene oxide is substituted for the propylene oxide and/or 1,2-epoxybutane reactant(s) and metered into the reactor until the desired level of ethoxylation is achieved. Pressures in the reactor will usually remain at less than 100 pounds per square inch gauge during these reactions. The resulting poly(alkyleneoxy) material is removed from the reactor, the alkaline reagent neutralized with acid, and the product recovered by filtration. This non-ionic material may be converted to the sulfate, sulfonate, phosphate ester, acetate, or isethionate (or their salts), or the chloride or quaternary ammonium derivative by the methods heretofore described.

The number of epoxy, e.g., alkyleneoxy, groups present in the polymerizable surfactant material will vary as described with respect to graphic formula I. The number of epoxy units present per mole of surfactant of graphic formula I, i.e., the letters "m" and "n", is the average number of moles of alkyleneoxy groups present per mole of surfactant and hence the value of m and n may be a fractional number between 5 and 100, e.g., between 10 and 40.

Polymerizable surfactant materials of the present invention may be used in emulsion (or suspension) or solution polymerizations. Such polymerizations may be carried out by free radical initiated polymerization using batch, continuous, or controlled monomer feed processes, known conditions of stirring time and temperature, and known kinds of additives such as initiators, surfactants, electrolytes, pH adjusting agents, buffering agents and the like. In general, the emulsion or solution polymerization will carried out from about 20° C. to about 120° C., e.g., between about 50° C. and about 80° C. Batch polymerization times may vary depending on the method of polymerization and the monomers being polymerized. Such times may vary from about 2 to about 10 hours. The polymerizable surfactant materials of the present invention are particularly useful in emulsion polymerization processes of the liquid phase type wherein water comprises the continuous phase and the monomer(s) is present substantially as a dispersed phase at the initiation of polymerization. The polymerization medium has incorporated therein at a minimum a sufficient amount of the polymerizable surfactant of the present invention to produce a stable, small particle size, dispersed monomer emulsion or suspension. The polymerizable surfactant of the present invention may be added batchwise, semicontinuously or continuously to the polymerizable reaction mixture.

The quantity of polymerizable surfactant used in the polymerization of ethylenically unsaturated monomers, particularly when used as the sole emulsion polymerization surfactant, may range from about 1.0 to about 10 weight percent based on the total reactant monomer content employed in the given emulsion polymerization system. Preferably, the amount of such polymerizable surfactant material employed ranges from about 3.0 to about 6 weight percent, similarly based on total monomer.

The polymerizable surfactant materials of the present invention may be used in an emulsion polymerization reaction in combination with conventional emulsion polymerization surfactants that are not reactive, i.e., non-copolymerizable with the polymerizable monomers. In selecting cosurfactant materials to be used, anionic and cationic materials should not be used together. Anionic and non-ionic surfactant materials or cationic and non-ionic surfactant materials may be used in combination. The reactive surfactants of the present invention themselves characteristically display excellent capacity for producing emulsion stability characteristics in the emulsion polymerization. It is contemplated that such conventional surfactants will be used in amounts of from 3 to 6 weight percent, based on the total amount of monomer(s).

In another embodiment of the present invention, it is contemplated that polymerizable surfactants of the present invention may be used as comonomers with the ethylenically unsaturated monomer(s) to modify the physical properties of the resulting polymer. The amount of polymerizable surfactant that may be so used may vary, e.g., from about 1 to about 25 weight percent, but will commonly be in the range of from about 1 to about 10, e.g., 3 to 6, weight percent, based on the total reactant monomer content. In this embodiment, conventional emulsion polymerization surfactants also may be used as additives to the polymerization, e.g., in amounts of from about 3 to 6 weight percent, based on the total amount of monomeric reactants to be polymerized.

In a further embodiment of the present invention, ethylenically unsaturated monomer(s) and from 1–25 weight percent (as described hereinbefore) of the polymerizable reactive compounds represented by graphic formula I are copolymerized by solution polymerization. Any conventional organic solvent, which may be a solvent for both the monomer(s) and polymer, or just the monomer(s) may be used. Organic or inorganic free-radical initiators, as described herein, may be used to initiate the solution polymerization.

A sufficient quantity of a polymerization initiator (such as a conventional free radical initiator) is introduced into the polymerization medium to cause polymerization of the monomer(s) at the particular temperatures employed. Initiators used in emulsion polymerization processes are of the type which produce free radicals and conveniently are peroxygen compounds, for example: inorganic peroxides such as hydrogen peroxide and inorganic persulfate compounds such as ammonium persulfate, sodium persulfate and potassium persulfate; organic hydroperoxides such as cumene hydroperoxide and tertiary butyl hydroperoxide; organic peroxides such as benzoyl peroxide, acetyl peroxide, lauroyl peroxide, peroxydicarbonate esters such as diisopropyl peroxydicarbonate, peracetic acid and perbenzoic acid—sometimes activated by water-soluble reducing agents such as a ferrous compound, sodium bisulfite or hydroxylamine hydrochloride—and other free radical producing materials such as 2,2'-azobisisobutyronitrile.

Conventional cationic nonpolymerizable surfactants include the classes of salts of aliphatic amines, especially the fatty amines, quaternary ammonium salts and hydrates, fatty amides derived from disubstituted diamines, fatty chain derivatives of pyridinium compounds, ethylene oxide condensation products of fatty amines, sulfonium compounds, isothiouronium compounds and phosphonium compounds. Specific examples of the cationic surfactants are dodecylamine acetate, dodecyl-amine hydrochloride, tetradecylamine hydrochloride, hexadecylamine acetate, lauryl dimethylamine citrate, octadecylamine sulfate, dodecyl-amine lactate, cetyl trimethyl ammonium bromide, cetyl pyridinium chloride, an ethanolated alkyl guanidine amine complex, stearyl dimethyl benzyl ammonium chloride, cetyl dimethyl amine oxide, cetyl dimethyl benzyl ammonium chloride, tetradecylpyridinium bromide, diisobutyl phenoxy ethoxy ethyl dimethyl benzyl ammonium chloride, 1-(2-hydroxy-ethyl)-2-(mixed pentadecyl and heptadecyl)-2-imidazoline, resin amine ethoxylate, oleyl imidazoline, octadecyl ethylmethyl sulfonium methyl sulfate, dodecyl-bis-B-hydroxyethylsulfonium acetate, dodecylbenzyl-dimethylsulfonium chloride, dodecylbenzyltrimethylphosphonium chloride and S-p-dodecylbenzyl—N—N—N'—N'-tetramethylisothioronium chloride.

Representative types of anionic emulsifiers are the alkyl aryl sulfonates, the alkali metal alkyl sulfates, the sulfonated alkyl esters, the fatty acid soaps and the like.

Specific examples of these well known emulsifiers are sodium dodecylbenzene sodium sulfonate, sodium butyl naphthalene sulfonate, sodium lauryl sulfate, disodium dodecyldiphenyl ether disulfonate, n-octadecyl disodium sulfosuccinate and dioctyl sodium sulfosuccinate.

Typical nonionic emulsifiers (surfactants) are compounds formed by the reaction of an alkylene oxide, such as ethylene oxide, propylene oxide or butylene oxide, with long chain fatty alcohols, long chain fatty acids, alkylated phenols, long chain alkyl mercaptans, long chain alkyl primary amines, for example, cetylamine, the alkylene oxides being reacted in a ratio of from about 5 moles to 20 moles or higher, e.g., up to 50 moles, per mole of the coreactant. Other representative compounds are monoesters, e.g., the reaction products of a polyethylene glycol with a long chain fatty acid, glycerol monostearate, sorbitan trioleate and partial and complete esters of long chain carboxylic acids with polyglycol ethers of polyhydric alcohols. By "long chain" in the above description is meant an aliphatic group having from six carbon atoms to 20 carbon atoms or more.

A further additive that may be introduced into the polymerization reaction media is a conventional chain transfer agent such as an alkyl polyhalide or mercaptan. Examples include: bromoform, carbon tetrachloride, carbon tetrabromide, bromoethane, alkyl mercaptans of 1 to 12 carbon atoms, e.g., dodecylmercaptan, thiophenol and hydroxyalkyl mercaptans, e.g., mercaptoethanol.

Ethylenically unsaturated monomer(s) which may be copolymerized with an ethylenically unsaturated, polymerizable material of graphic formula I are well known in the art and are illustrated herein only by representative example. Ethylenically unsaturated monomers are represented by, but not restricted to, mono- and polyunsaturated hydrocarbon monomers, vinyl esters, e.g., vinyl esters of $C_1$–$C_6$ saturated monocarboxylic acids, vinyl ethers, monoethylenically unsaturated mono- and polycarboxylic acids and their alkyl esters, e.g., acrylic acid esters and methacrylic acid esters, (particularly their $C_1$–$C_{12}$ alkyl, more particularly their $C_1$–$C_4$ alkyl, esters), the nitriles, vinyl and vinylidene halides, amides of unsaturated carboxylic acids and amino monomers.

Representative examples of hydrocarbon monomers include compounds such as the styrene compounds, e.g., styrene, carboxylated styrene, and alpha-methyl styrene, and conjugated dienes, for example, butadiene, isoprene and copolymers of butadiene and isoprene. Representative examples of vinyl and vinylidene halides include: vinyl chloride, vinylidene chloride, vinyl fluoride and vinylidene fluoride.

Acrylic ester and methacrylic ester examples include $C_1$–$C_{12}$, e.g., $C_1$–$C_4$, alkyl acrylates and methacrylates. Typical acrylic esters and methacrylic esters include methyl acrylate, methyl methacrylate, ethyl acrylate, ethyl methacrylate, isopropyl acrylate, isopropyl methacrylate, n-butyl acrylate, n-butyl methacrylate, isobutyl acrylate, isobutyl methacrylate, hexyl acrylate, 2—ethylhexyl acrylate, 2—ethylhexyl methacrylate, t-butyl acrylate, t-butyl methacrylate, 3,3-dimethylbutyl acrylate, 3,3-dimethyl butyl methacrylate, and lauryl acrylate.

Suitable vinyl esters include aliphatic vinyl esters, such as vinyl formate, vinyl acetate, vinyl propionate, vinyl butyrate, vinyl isobutyrate, vinyl valerate, and vinyl caproate, and allyl esters of saturated monocarboxylic acids, such as allyl acetate, allyl propionate and allyl lactate.

Typical vinyl ethers include methylvinyl ether, ethylvinyl ether and n-butylvinyl ether. Typical vinyl ketones include methylvinyl ketone, ethylvinyl ketone and isobutylvinyl ketone. Suitable dialkyl esters of monoethylenically unsaturated dicarboxylic acids include dimethyl maleate, diethyl maleate, dibutyl maleate, dioctyl maleate, diisooctyl maleate, dinonyl maleate, diisodecyl maleate, ditridecyl maleate, dimethyl fumarate, diethyl fumarate, dipropyl fumarate, dibutyl fumarate, dioctyl fumarate, diisooctyl fumarate, didecyl fumarate, dimethyl itaconate, diethyl itaconate, dibutyl itaconate and dioctyl itaconate.

Suitable monoethylenically unsaturated monocarboxylic acids include acrylic acid, methacrylic acid, ethacrylic acid and crotonic acid; monoethylenically unsaturated dicarboxylic acids, such as maleic acid, fumaric acid, itaconic acid and citraconic acid; and monoethylenically unsaturated tricarboxylic acids, such as aconitic acid and the halogen-substituted derivatives, e.g., alpha-chloroacrylic acid, and anhydrides of these acids, such as, e.g., maleic anhydride and citraconic anhydride are suitable for use as monomers.

Acrylonitrile, alpha-chloro-acrylonitrile and methacrylonitrile are among the corresponding nitriles of such acids which can be used as monomers. Suitable amides of such acids include unsubstituted amides such as acrylamide, methacrylamide and other alpha-substituted acrylamides and N-substituted amides obtained by conventional reaction of the amides of the aforementioned mono- and poly-carboxylic acids with an aldehyde, such as formaldehyde. Typical N-substituted amides include N-methylolacrylamide, N-methylolmethacrylamide, alkylated N-methylolacrylamides and N-methylolmethacrylamides, such as N-methoxymethylacrylamide and N-methoxymethylmethacrylamide.

Typical amino monomers include substituted and unsubstituted aminoalkyl acrylates, hydrochloride salts of amino monomers and methacrylates, such as beta-aminoethylacrylate, beta-amino- ethylmethacrylate, dimethylamino-methylacrylate, beta-methylaminoethylacrylate, and dimethylaminomethylmethacrylate.

Hydroxy-containing monomers include beta-hydroxyethylacrylate, beta-hydroxypropylacrylate, gamma-hydroxypropylacrylate and beta-hydroxy-ethylmethacrylate.

The aforesaid monomers, particularly the acrylic esters and methacrylic esters, may be homopolymerized or copolymerized with other of the described monomers, i.e., one or more different monomers capable of addition type polymerization.

The reactive surfactants of the present invention may find particular use in polymerization systems including various monomer and monomer mixtures to form homopolymers and copolymers, such as vinyl acetate-acrylic monomer mixtures, vinyl acetate monomer, ethylene-vinyl acetate monomer mixtures, styrene, styrene-acrylic monomer mixtures, butadiene-acrylonitrile monomer mixtures, styrene-butadiene monomer mixtures, vinyl chloride, vinylidene chloride, vinyl fluoride, vinylidene fluoride, and mixtures of other monomers with each of said vinyl and vinylidene halides, acrylic monomer-acrylonitrile monomer mixtures, and all acrylic monomer mixtures. The term "acrylic" as used herein is intended to mean and include one or more acrylic esters and/or methacrylic esters with and without acrylic acid or methacrylic acid. Such monomer mixtures are well known to the skilled artisan.

The polymerizable surfactants of the present invention polymerize along with the conventional reactant monomer(s) in the polymerization process, thereby to form water-insoluble, substantially surfactant-free polymer particles. Thus, the polymer latex product is not contaminated with an undesirable residue of water-soluble surfactant. The polymer product has improved resistance to water and may be used in any end use application for which the particular polymer product produced from the conventional reactant monomer(s) may be used. Examples include interior and exterior coatings, e.g., latex paints, container, paper and paperboard coatings, e.g., can coatings, adhesives, such as waterborne adhesives and pressure sensitive adhesives, sealants, industrial coatings, automotive coatings, textile coatings and binders, floor finishes, water-based inks, films, and binders for non-woven materials such as carpet backing.

The polymer product prepared with the polymerizable surfactants of the present invention may be used as the principle resin component or as a minor component of a resin mixture used to prepare the coatings, adhesives, sealants, binders, inks, floor finishes, etc. described herein. The remainder of the film forming composition may comprise various fillers, e.g., pigments, colorants, etc., solvents, e.g., aqueous or organic solvents, plasticizers, antioxidants, curing agents, thickeners, surfactants, preservatives, wet strength additives, and other adjuvant materials added in conventional amounts to resin compositions used in the aforedescribed end-use applications.

The present invention is more particularly described in the following examples, which are intended as illustrative only since numerous modifications and variations therein will be apparent to those skilled in the arts.

EXAMPLE 1

A one liter magnetically stirred autoclave was charged with 58.1 grams of allyl alcohol and 0.92 grams of sodium hydroxide. The autoclave was sealed and the air atmosphere therein replaced with nitrogen. The autoclave was pressurized with nitrogen to 10 pounds per square inch gauge (psig) (69 kPa) and the contents heated to 120° C. 1,2-epoxybutane was introduced slowly and continuously into the autoclave while the reactor contents were maintained between about 110° C. and 130° C. The maximum operating pressure during addition of the 1,2-epoxybutane was less than 100 psig (690 kPa). After 600 grams of 1,2-epoxybutane had been introduced into the autoclave, the reaction slowed. The contents of the autoclave were cooled to about 15° C., the autoclave opened and an additional 0.66 grams of sodium hydroxide introduced into the autoclave to enhance the rate of alkoxylation. The autoclave was closed, the air atmosphere replaced with nitrogen, the autoclave pressurized to a pressure of 10 psig (69 kPa) with nitrogen and the contents heated to 120° C. 1,2-epoxybutane was again charged to the autoclave until the total amount of epoxybutane added reached about 865 grams. When the pressure in the autoclave reached a steady value, the autoclave was cooled. 886.4 grams of a light yellow-colored liquid product was recovered. The product was subjected to vacuum degassing to remove any residual unreacted 1,2-epoxybutane from the product. The degassed product was identified as the butoxylated product of allyl alcohol. Proton nuclear magnetic resonance (NMR) spectroscopy indicated that the number of butoxy groups in the product was about 12.3 per molecule.

A one liter magnetically stirred autoclave was charged with 332 grams of the above-described degassed butoxylated allyl alcohol. After replacing the air atmosphere in the autoclave with nitrogen, the butoxylated allyl alcohol was heated to 120° C. and 240 grams of ethylene oxide added slowly to the autoclave over a period of about 3 hours so as to maintain the reaction temperature at 120° C. and the operating pressure below 90 psig (621 kPa). The resultant product was allowed to cool to 30° C. and 0.89 grams of acetic acid added to the reaction product for neutralization of the basicity in the reaction mixture. The final product was a light yellow liquid. The number of ethoxy units per molecule in the product were determined by proton NMR to be about 15.3. This product will be referred to herein as Sample 1-A. A 0.1 weight percent aqueous solution of Sample 1-A was prepared and the surface tension of the solution measured at 25° C. with a Du Nouy tensiometer. The surface tension was found to be 31.6 dynes/centimeter.

The one liter autoclave was charged with 277 grams of the degassed butoxylated allyl alcohol and flushed with nitrogen for 30 minutes. The butoxylated allyl alcohol was heated to 120° C. and 330 grams of ethylene oxide charged slowly over about 3 hours to the autoclave while maintaining the reaction temperature at about 120° C. and the operating pressure below 90 psig (621 kPa). 0.74 grams of acetic acid were added to neutralize the basicity in the product. 614.7 grams of a light yellow liquid product was recovered. Proton-NMR indicated that the number of ethoxy groups per molecule in the product was about 26.1. This product will be referred to herein as Sample 1-B. The surface tension of a 0.1 weight percent aqueous solution of Sample 1-B product was 32.2 dynes/centimeter at 25° C.

The one liter autoclave was charged with 221 grams of the degassed butoxylated allyl alcohol, flushed with nitrogen, and the butoxylated allyl alcohol heated to 120° C. 370 grams of ethylene oxide were charged slowly to the autoclave over about 4 hours while maintaining the reaction temperature at about 120° C. and the reaction pressure at less than 100 psig (690 kPa). When all of the ethylene oxide had been charged to the autoclave, the pressure was permitted to equilibrate and the autoclave cooled. 0.59 grams of acetic acid were added to neutralize the basicity in the reaction product. Proton—NMR indicated that the number of ethoxy units in the light yellow liquid product was about 40.6. This product will be referred to herein as Sample 1-C. The surface tension of a 0.1 weight percent aqueous solution of the Sample 1-C product was 33.6 dynes/centimeter at 25° C.

EXAMPLE 2

A two liter, jacketed round-bottom flask equipped with a phosgene inlet tube, dry ice cooled condenser, stirrer and dropping funnel was charged with 20 grams of liquid phosgene. The reaction flask was then charged simultaneously with 477 grams of product Sample 1-B described in Example 1 and 40 grams of additional phosgene. The reaction mixture was stirred at 15°-20° C. for several hours before excess phosgene was removed by degassing the reaction product. The resulting chloroformate was converted to the corresponding chloride by heating it in the presence of 1.23 grams of trioctyl methyl ammonium chloride at 120°-140° C. for 4 hours.

480 grams of product were recovered. The product was confirmed as the corresponding chloride by proton-NMR and infrared spectroscopy, and total chloride analysis.

EXAMPLE 3

A 0.5 liter magnetically stirred autoclave was charged with 100.7 grams of the chloride product of Example 2, 12.3 grams of sodium sulfite (98 percent), 265.1 grams of deionized water and 1.2 grams of a 50 percent aqueous solution of sodium hydroxide. The autoclave was sealed and the contents heated to 155° C. and maintained at temperature overnight. The pressure within the autoclave stabilized at about 60 psig (414 kPa). The contents of the autoclave were cooled subsequently to less than 5° C. The product, i.e., the corresponding sulfonate of the chloride product of Example 2, was a light yellow liquid containing 28.3 percent solids with 7.2 percent (as is) anionic surfactant activity.

EXAMPLE 4

The procedure of Example 3 was repeated except that 77.4 grams of the pre-formed sulfonate product produced in Example 3 was added to the autoclave with the reactants. 423.7 grams of a light yellow clear liquid product was recovered from the autoclave. The product was treated with 1.00 grams of hydrogen peroxide (49.5 percent) for removal of residual sulfite anion. The product contained about 30 percent solids and analyzed about 14.6 percent anionic surfactant activity.

EXAMPLE 5

The procedure of Example 3 was repeated except that 113.2 grams of the pre-formed sulfonate product from Example 4 was added to the autoclave with the reactants. The product was a light yellow clear liquid. It was treated with 1.33 grams of hydrogen peroxide (49.5 percent) for removal of residual sulfite anion.

The sulfonate product was combined with the product of Example 4. The resultant mixture had a solids content of about 28.3 percent and analyzed about 16.2 percent anionic surfactant activity. The surface tension of a 0.1 weight percent aqueous solution of the product was found to be 35.6 dynes/centimeter at 25° C.

EXAMPLE 6

Using the procedure of Example 2, 401 grams of Sample 1-A were reacted with phosgene and the resulting chloroformate decarboxylated to the corresponding chloride with 1.1 grams of trioctyl methyl ammonium chloride. 77.7 grams of the resulting chloride product were converted to the sulfonate by the procedure of Example 3 utilizing 15.4 grams of sodium sulfite, 174.3 grams of deionized water and 1.54 grams of a 50 percent aqueous solution of sodium hydroxide. A milky light yellow liquid containing 33.3 percent solids with 9.6 percent anionic surfactant activity was obtained.

EXAMPLE 7

The sulfonation procedure of Example 3 was followed using 77.7 grams of the chloride product of Example 6, 15.4 grams of sodium sulfite, 1.54 grams of sodium hydroxide, 218.3 grams of deionized water and 135.9 grams of the pre-formed sulfonate product produced in Example 6. The product contained about 29.3 percent solids and analyzed about 10.8 percent anionic surfactant activity. After standing for about two weeks, the product was observed to have separated into two layers.

EXAMPLE 8

The procedure of Example 7 was repeated except that 149.8 grams of the top layer of the sulfonate product of Example 7 was used as the pre-formed sulfonate in the sulfonation reaction. The sulfonate product was treated with 1.33 grams of hydrogen peroxide (49.5 percent) to remove residual sulfite anion, and then combined with the remainder of the sulfonate product from Example 7. The combined product had 11.1% anionic surfactant activity and contained about 31.8 percent solids. The surface tension of a 0.1 weight percent aqueous solution of the product was found to be 35.9 dynes/centimeter at 25° C.

EXAMPLE 9

Following the procedure of Example 2, 407 grams of Sample 1-C were converted to the corresponding chloroformate with phosgene. The chloroformate was decarboxylated to the corresponding chloride with 1.05 grams of trioctyl methyl ammonium chloride. 115.6 grams of the resulting chloride product were converted to the corresponding sulfonate by the procedure of Example 3 utilizing 10.8 grams of sodium sulfite, 1.1 grams of a 50 percent aqueous solution of sodium hydroxide and 296.2 grams of deionized water. The product was a light yellow clear solution at 60° C. It was treated with 1.9 grams of hydrogen peroxide (49.5 percent) to remove any residual sulfite anion. The product contained 28.8 percent solids with 15.8 anionic surfactant activity.

EXAMPLE 10

The sulfonation procedure of Example 9 was repeated except that 57.1 grams of the pre-formed sulfonate product of Example 9 was added to the autoclave with the reactants. The product was a clear light yellow liquid which was treated with 1.76 grams of hydrogen peroxide to remove residual sulfite anion. The sulfonate product contained about 31.9 percent solids and analyzed 18.7 percent anionic surfactant activity.

The sulfonate product was combined with the remainder of the product from Example 9. The resulting product contained about 32.6 percent solids and analyzed about 16.1 percent anionic surfactant activity. The surface tension of a 0.1 weight percent aqueous solution of the product was found to be 35.1 dynes/centimeter at 25° C.

EXAMPLE 11

A vinyl acetate-butyl acrylate copolymer was prepared utilizing the sulfonate product of Example 5 as the sole surfactant. A one liter resin kettle was charged with a solution of 31.7 grams of the sulfonate product of Example 5 in 281 grams of deionized water. The solution was heated to 80° C. under a nitrogen atmosphere. One gram of potassium persulfate ($K_2S_2O_8$) was added to the solution followed by the slow addition of 50 milliliters of a mixture comprising 202 grams of vinyl acetate and 36 grams of butyl acrylate. The polymerization temperature was maintained at 75°–80° C. for 30 minutes after the addition of the 50 milliliter portion of the monomer mixture. The remainder of the monomer mixture was charged to the kettle over a 3–4 hour period while maintaining the polymerization temperature at between 70° C. and 75° C. The contents of the resin kettle were post stirred at 70° C. for 1 hour and then 10 grams of 2 percent formaldehyde sulfoxylate added to the kettle to complete the polymerization.

The kettle contents were allowed to cool to ambient temperature and the latex in the kettle recovered by filtration through a cheese cloth. Less than 1 percent of the polymer product had coagulated. A portion of the latex was cast into a film and the film dissolved in chloroform-d (CD$_3$Cl). Proton-NMR spectroscopy of the chloroform solution did not reveal the presence of any allylic hydrogens, which indicated that the sulfonate product of Example 5 had reacted completely during the polymerization.

A film of the la(ex was cast onto a microscope slide and air dried for at least 24 hours. A NRL contact angle goniometer, Model 100-00, was employed to measure the contact angle of a drop of deionized water placed onto the film. The contact angle was determined within 10 seconds of the water being placed upon the film and was found to be 52°.

EXAMPLE 12

For purposes of comparison, the emulsion polymerization of Example 11 was performed using 24 grams of sodium lauryl sulfate, (30 percent active) as the sole surfactant. The product was recovered by filtration through a cheese cloth and less than 1 percent of the product was found to have coagulated.

In accordance with the procedure described in Example 11, the contact angle for a drop of water placed on a film prepared from the aforesaid latex was measured. The water droplet was observed to spread immediately with a resulting contact angle of less than 5°.

The contact angle measurements of Examples 11 and 12 show that the latex prepared with the copolymerizable surfactant of Example 5 was less water sensitive than those made from conventional emulsifiers, i.e., sodium lauryl sulfate.

EXAMPLE 13

A vinyl acetate homopolymer was prepared utilizing the sulfonate product of Example 10 containing about 32.6 percent solids as the sole surfactant. A one liter resin kettle was charged with a solution of 20.0 grams of the sulfonate product of Example 10 in 238 grams of deionized water. The solution was heated to 80° C. under a nitrogen atmosphere and 0.5 grams of potassium persulfate (K$_2$S$_2$O$_8$) added to the solution. 50 grams of vinyl acetate was added slowly to the resin kettle. The reaction temperature was maintained at 75°-80° C. for 30 minutes after completing the initial charge of vinyl acetate. Subsequently, 150 grams of vinyl acetate was added to the kettle over 3-4 hours while maintaining the polymerization temperature at about 80° C. The contents of the resin kettle were post stirred for one hour at 85° C., cooled to ambient temperature, and filtered through a cheese cloth. The amount of coagulation found was about one percent. A film of the latex was cast onto a microscope slide and air dried for at least 24 hours. The contact angle for a drop of water placed on the film was measured (as per Example 11) and found to be 53°. The contact angle of a drop of water placed on a vinyl acetate film cast from a vinyl acetate latex prepared with conventional surfactants is typically less than 10°.

EXAMPLE 14

A monomer mixture was prepared by admixing 132 grams of ethyl acrylate, 62 grams of n-butyl acrylate, 3 grams of acrylic acid, and 6.25 grams of a 48 percent by weight aqueous solution of N-methylolacrylamide.

Deionized water in the amount of 157.7 grams and 2.5 grams of a polymerizable surfactant corresponding to graphic formula I wherein R is allyl, R' is butylene, m is about 12, n is about 15, and X is monoammonium sulfate (viz., SO$_4^-$NH$_4^+$) were admixed with all of the monomer mixture to form a stable emulsion.

A resin kettle was charged with 80.5 grams of deionized water, 1.5 grams of the polymerizable surfactant, 0.6 gram of sodium bicarbonate, and 1 gram of ammonium persulfate. The charged materials were heated to 80° C. under a nitrogen blanket. Over a period of 2 hours and 55 minutes all of the stable emulsion was added to the resin kettle while maintaining the temperature at about 80° C. Upon completion of the addition, the reaction mixture was stirred for one hour at temperatures in the range of from 80° C. to 85° C. after which the reaction mixture was cooled to about room temperature. The reaction mixture was filtered through a preweighed 60 mesh stainless steel screen into a sample bottle. It was found that the screen retained 1.9 grams of coagulum, which was discarded. The latex product in the sample bottle comprised 44.6 percent by weight solids. The yield based on monomer weight was 97 percent.

EXAMPLE 15 (Comparative)

The surfactant used in this example was sulfated nonylphenol ethoxylate (EP-120; GAF Chemical Corp.).

A monomer mixture was prepared by admixing 132 grams of ethyl acrylate, 62 grams of n-butyl acrylate, 3 grams of acrylic acid, and 6.25 grams of a 48 percent by weight aqueous solution of N-methylolacrylamide.

Deionized water in the amount of 155.1 grams and 8.33 grams of the surfactant were admixed with all of the monomer mixture to form a monomer emulsion that was less stable than the corresponding emulsion of Example 14.

A resin kettle was charged with 77.0 grams of deionized water, 5 grams of the surfactant, 0.6 gram of sodium bicarbonate, and 1 gram of ammonium persulfate. The charged materials were heated to 80° C. under a nitrogen blanket. Over a period of 3 hours all of the monomer emulsion was added to the resin kettle while maintaining the temperature at about 80° C. Upon completion of the addition, the reaction mixture was stirred for one hour at temperatures in the range of from 80° C. to 85° C. after which the reaction mixture was cooled to about room temperature. The reaction mixture was filtered through a preweighed 60 mesh stainless steel screen into a sample bottle. It was found that the screen retained 15 grams of coagulum which was discarded. The latex product in the sample bottle comprised 44.1 percent by weight solids. The yield based on monomer weight was 95.9 percent.

EXAMPLE 16

Fabric samples measuring 25.4 centimeters × 25.4 centimeters were cut from 100% cotton interlock knit (style 460) fabric and from 50% cotton/50% polyester knit (style 7421) fabric from Test Fabrics, Inc. of Middlesex, New Jersey. A first test composition was prepared by admixing 60 grams of the latex product of Example 14 with 340 grams of deionized water. A second test composition was prepared by admixing 60 grams of the latex product of Example 15 with 340 grams of deionized water. A control test composition consisted of deionized water only.

Each fabric sample was weighed, submerged for 30 seconds in a test composition, and wrung out using an Atlas Laboratory Wringer with 11.34 kilograms on the arm. The fabric sample was then briefly submerged in the test composition and wrung out again. The fabric sample was weighed and then hung and dried in a Despatch oven at 149° C. for 7 minutes. The dry fabric sample was lightly pressed and then marked in about the center of the fabric sample with a grid pattern of straight lines running parallel to the edges of the fabric sample. The grid was drawn in the following manner: Two parallel lines five (5) inches (12.7 centimeters) apart were drawn parallel to the easily stretchable side. A second set of lines offset (in the same direction) one (1) inch (2.5 centimeters) from the first set of lines was drawn parallel to the first set of lines. The fabric was rotated 90° and the procedure repeated, thereby creating a second set of four (lines) parallel to the substantially non-stretchable side. These eight (8) lines comprised the grid pattern.

After an overnight conditioning period, all of the fabric samples and additional fabric added as ballast were subjected to five wash-rinse-dry cycles. In each cycle, the fabric samples and the ballast fabric were washed and rinsed in a Kenmore ® Heavy Duty 70 Series Model/Stock No. 110.82873110 washing machine set on "Heavy Soil." Washing was accomplished at 49° C. using 90 grams of AATCC Standard Detergent #124. Rinsing was accomplished at 29° C. Deionized water was used for both washing and rinsing. The rinsed fabric samples and ballast fabric were then dried in a Soft Heat Kenmore ® Model 110.86873100 electric clothes dryer set on "Less Dry."

The distances between the parallel lines of the grid that were five (5) inches (12.7 centimeters) apart were measured at three points along the length of the line for a total of twelve measurements per fabric sample. Each set of three measurements was averaged and the percent shrinkage was calculated. The data are shown in Tables 1 and 2 where the sides of a fabric sample along which measurements were taken are abbreviated as follows:
S1 = One easily stretchable side;
S2 = The opposite easily stretchable side;
S3 = One substantially non-stretchable side;
S4 = The opposite substantially non-stretchable side.

TABLE 1

Effects of Latex Treatments on 100% Cotton Fabric

| Latex Product | Percent Shrinkage | | | |
|---|---|---|---|---|
| | S1 | S2 | S3 | S4 |
| Example 14 | 3.75 | 2.50 | 3.75 | 3.75 |
| Example 15 | 7.50 | 7.50 | 7.50 | 10.00 |
| Control (Deionized Water) | −5.25* | −5.00* | 15.00 | 15.50 |

*A negative value indicates that the fabric stretched.

TABLE 2

Effects of Latex Treatments on 50/50 Cotton Polyester Fabric

| Latex Product | Percent Shrinkage | | | |
|---|---|---|---|---|
| | S1 | S2 | S3 | S4 |
| Example 14 | 1.25 | 1.25 | 1.25 | 0.00 |
| Example 15 | 1.25 | 1.25 | 2.50 | 1.25 |
| Control (Deionized Water) | 1.88 | 2.08 | 5.83 | 5.63 |

The data of Tables 1 and 2 show that the latex prepared with the polymerizable surfactant described in Example 14 was more effective in reducing shrinkage than the latex prepared with the surfactant described in Example 15.

Example 17 (Comparative)

(Step 1: Propoxylation of Oleyl Alcohol)

A one liter autoclave was charged with 268.5 grams of 9,10-octadecenol (oleyl alcohol) and 2.0 grams of potassium hydroxide. The oleyl alcohol-potassis hydroxide mixture was heated to 110° C. and degassed by bubbling nitrogen through the mixture for one hour. The autoclave was closed and pressurized to 5 pounds per square inch gage (34 kPa) with nitrogen. Propylene oxide (525 grams) was charged slowly to the autoclave over a period of about 5 hours. For the first one and one-half hours, the temperature within the autoclave was maintained between about 108° C. and 111° C. during which time the pressure within the autoclave increased to about 90 pounds per square inch gage (621 kPa). Thereafter, the temperature within the autoclave was raised to 120° C. and the pressure within the autoclave increased to about 100 pounds per square inch (690 kPa). The autoclave temperature and pressure were maintained at those levels for the remaining three and one-half hours during which the balance of the propylene oxide was charged to the autoclave. After all of the propylene oxide had been charged, the autoclave was permitted to cool overnight. In the morning, the reaction mixture in the autoclave was heated to 120° C. and maintained at that temperature for one additional hour. The reaction mixture was permitted to cool to about 70° C. and unreacted propylene oxide and nitrogen within the autoclave vented through a bleed valve. The propoxylated oleyl alcohol product was a light yellow clear liquid. The hydroxyl number of the product was determined, and from that value, the number of propyleneoxy units in the product was calculated to be about 7.7.

(Step 2: Sulfation of Propoxylated Oleyl Alcohol)

The propoxylated oleyl alcohol product of Step 1 (381.2 grams) and urea catalyst (3.8 grams) were mixed and heated to 110° C. for one hour under nitrogen in a reaction vessel. Thereafter, 53.4 grams of sulfamic acid (10 mole percent excess) were added to the reaction vessel and the reaction mixture maintained at 110° C. for ten hours. The resultant ammonium propoxylated oleyl sulfate product was a light brown viscous liquid containing urea catalyst and excess sulfamic acid solids. The product was filtered at about 60° C. to remove all of the solids contained therein.

Example 18 (Comparative)

Vinyl acetate (180 grams) and butyl acrylate (20 grams) were mixed in a 400 milliliter beaker. This monomer mixture was formed into an emulsion by mixing it with 126 grams of deionized water and 6 grams of the ammonium propoxylated oleyl sulfate of Example 17. A stable emulsion was formed. A resin kettle was charged with 127.7 grams of deionized water, 0.6 grams of sodium bicarbonate and 1.0 grams of ammonium persulfate [$(NH_4)_2S_2O_8$], and the contents of the resin kettle heated to 80° C. under nitrogen. The monomer emulsion was then charged to the resin kettle over about 3 hours while maintaining the temperature of the resin kettle contents at about 80° C., thereby to copolymerize the monomers. Thereafter, the resultant polymer product was stirred at 80°-85° C. for one additional hour and subsequently cooled to room temperature. The cooled polymer product was filtered through a 60 mesh stainless steel screen. 1.6 grams (0.35 percent) of coagulum (oversized polymer product) were recovered from the screen. The latex product passing through the screen contained 44.7 percent solids, which was calculated to be a 99.3 percent yield. The mean particle size of the latex product was 220 nanometers.

Example 19

The procedure of Example 18 was followed except that 6 grams of an ammonium alkoxylated allyl sulfate was used in place of the ammonium propoxylated oleyl sulfate of Example 17. The alkoxylated allyl sulfate contained about 12 butoxy groups and about 15 ethoxy groups. The alkoxylated allyl alcohol was prepared in accordance with the procedure described in Example 1 (Sample 1-A), and the ammonium sulfate salt thereof prepared in the manner described in Example 17, Step 2. The polymer product produced in the resin kettle was filtered through a 60 mesh stainless steel screen and 1.0 grams (0.22 percent) of oversized polymer product recovered from the screen. The product passing through the stainless steel contained 44.2 percent solids which was calculated to be a 98.2 percent yield. The mean particle size of the latex particles in the polymer product was 179 nanometers.

Example 20

This Examples describes a simple test used to test the water sensitivity of a polymer film. The higher the contact angle—the higher the water resistivity, whereas a low contact angle value indicates that the film is very water sensitive.

Equal aliquots of each latex prepared in Examples 18 and 19 were coated onto separate glass microscope slides and allowed to air dry overnight to form a thin clear film. A NRL contact angle goniometer Model 100-00 was employed to measure the contact angle of a drop of deionized water placed onto each film with a syringe. The contact angle of each drop of water was measured over a period of 5 minutes. This procedure was repeated twice more for each film. It was observed that the film prepared with the latex of Example 18 became opaque where it was contacted with water. The contact angle data recorded is reported in the following Table 3.

TABLE 3

| Time (min) | Film of Example 18 | | | Film of Example 19 | | |
|---|---|---|---|---|---|---|
| | Test | | | | | |
| | #1 | #2 | #3 | #1 | #2 | #3 |
| 0 | 45 | 46 | 45 | 47 | 47 | 46 |
| 1 | 35 | 38 | 36 | 46 | 46 | 45 |
| 2 | 25 | 27 | 26 | 43 | 44 | 43 |
| 3 | 21 | 22 | 21 | 43 | 43 | 43 |
| 4 | 17 | 18 | 18 | 41 | 42 | 42 |
| 5 | 15 | 15 | 14 | 41 | 42 | 41 |

The data of Table 3 show that the drop of water placed on the film prepared with the latex of Example 18 did not hold its form but spread readily, as shown by the decreasing contact angle over the observed time period. In contrast, the drop of water placed on the film prepared with the latex of Example 19, i.e., the latex prepared using a surface active agent of the present invention, substantially retained its form during the observed time period, as shown by the relatively constant contact angle.

Example 21 (Comparative)

(Step 1: Preparation of Allylated Allyl Alcohol Ethoxylate)

Allyl alcohol ethoxylate containing 6 moles of ethylene oxide (162.5 grams, 0.5 mole) was heated at 105° C. for several hours in a 500 ml three-necked reaction flask equipped with a stirrer, thermometer and air-cooled condenser to remove any moisture in the product. The dried allyl alcohol ethoxylate was cooled to 70° C. and small amounts of sodium metal (11.5 grams, 0.5 mole) were added to the allyl alcohol ethoxylate over 7 hours. During addition of the sodium, hydrogen evolution was observed. A nitrogen purge was maintained in the reaction flask to avoid accumulating hydrogen in the flask. The reaction mixture was stirred overnight at 70° C. The next morning the resulting mixture, which was a clear brown solution, was cooled to 45° C. and allyl chloride (38.6 grams, 0.5 mole) was slowly added to the solution through an addition funnel. Exotherm was observed during addition of the allyl alcohol. A water bath and ice bath were used occasionally to maintain the reaction mixture at 45° C. The reaction mixture became cloudy with sodium chloride precipitate. The reaction mixture was stirred overnight at a temperature of 45° C. and used in Step 2.

(Step 2: Sulfonation of Allylated Allyl Alcohol Ethoxylate)

A portion of the reaction mixture from Example 21 (Step 1) (87 grams, 0.25 mole) was charged to a three-necked, 500 ml round-bottom reaction flask. A solution of sodium sulfite (34.7 grams, 0.275 mole), sodium bisulfite (39.0 grams, 0.375 mole) and water (196.4 grams) were added to the reaction flask. The resulting reaction mixture was heterogeneous and separated into two layers without agitation. The mixture was heated under nitrogen atmosphere to 80° C. and tertiary-butyl perbenzoate (1 gram) was added to the reaction mixture. After two hours at 80° C., 100 milliliters of isopropanol were added to the reaction mixture, which was stirred at 80° C. over the weekend. The reaction mixture became clear and contained a solid precipitate. The precipitated solids were removed by filtration and the isopropanol removed under reduced pressure. The reaction mixture comprised a small top layer and a bottom layer of sulfonated allylated allyl alcohol ethoxylate, which was separated with a separatory funnel.

The foregoing sulfonation reaction was repeated using 100 grams of the foregoing preformed sulfonated allylated allyl alcohol ethoxylate, 87 grams (0.25 mole) of the allylated allyl alcohol ethoxylate of Example 21 (Step 1) and 2 grams of tertiary-butyl perbenzoate. The second sulfonation reaction was carried out for 72 hours at 80° C. A light yellow solid precipitate was removed from the resulting reaction product with a Buchner funnel. The final product was a light yellow homogeneous clear liquid with a solids content of 49.9 percent. This liquid was used in the emulsion polymerization of Example 22 and for the surface tension determinations described in Example 23.

Example 22 (Comparative)

An acrylate monomer mixture was prepared by mixing in a beaker butyl acrylate (95.0 grams), methyl methacrylate (95.0 grams), hydroxylpropyl methacrylate (8.0 grams) and acrylic acid (2.0 grams). A resin kettle was charged with 201 grams of deionized water and 12 grams of the liquid (50% solids) surfactant prepared in Example 21, i.e., about 6 grams of the sulfonated allylated allyl alcohol ethoxylate. The contents were heated to 80° C. under nitrogen and 1 gram of potassium persulfate added to the resin kettle. Thereafter, about 50 milliliters of the foregoing described monomer mixture were added dropwise to the resin kettle. After adding the foregoing small amount of monomer mixture, the contents of the resin kettle were maintained at 75°–80° C. for about 30 minutes. Subsequently, the remainder of the monomer mixture was added slowly to the resin kettle over 3–4 hours while maintaining the temperature within the resin kettle at about 75°–80° C., thereby to copolymerize the monomers. The contents of the resin kettle then were stirred at 80°–85° C. for 30 minutes and thereafter cooled to room temperature. The cooled polymer product was filtered through a 50 micron filtering bag into a sample bottle. The latex product passing through the filter contained 34.6 percent solids, which was calculated to be a 69.3 percent conversion of the monomer mixture. The amount of coagulum retained on the filter was about 14.5 percent.

Example 23

The monomer mixture used in Example 22 was polymerized following the same procedure described in Example 22, using an alkoxylated allyl sulfonate in place of the sulfonated allylated allyl alcohol ethoxylate of Example 21. The alkoxylated allyl sulfonate contained about 12 butoxy groups and about 15 ethoxy groups as described in Example 1 (Sample 1-A).

The filtered latex product contained 49.8 percent solids, which was calculated to be a 99.6 percent conversion. The amount of coagulum retained on the filter was about 1.4 percent.

Example 24

(Surface Tension Determination)

The surface tension of the surfactant prepared in Example 21 and the surfactant used in Example 23 were determined utilizing a Fisher Surface Tensiomat, Model 21, at three different concentrations. Results are tabulated in Table 4.

TABLE 4

| Surfactant of Example | Surface Tension, dyne/cm Concentration | | |
|---|---|---|---|
| | 1.0% | 0.5% | 0.1% |
| 21 | 64.7 | 61.9 | 64.7 |
| 23 | 35.9 | 35.9 | 37.7 |

The data of Table 4 clearly shows that the surfactant of Example 21 is not a surface active agent. The surface tension exhibited by distilled water is 72.6 dynes/cm and the surface tension exhibited by the surfactant of Example 21 at a concentration of 0.1 percents is only about 10 percent less than that of distilled water, i.e., 64.7 dynes/cm. In contrast, the surface tension exhibited by the surfactant of Example 23 at a concentration of 0.1 percent, is 37.7 dynes/cm. A good surface active agent, i.e., surfactant, will typically exhibit a surface tension of between 30 and 40 dynes/cm at a concentration of 0.1 percent. Materials that exhibit a surface tension at a concentration of 0.1 percent of greater than 50 dynes/cm are not generally considered to be good surfactants. In addition, the large amount of coagulum retained on the filter in Example 21 indicates that that the surfactant of Example 21 is not a suitable surface active agent for use in latex preparations.

Example 25 (Comparative)

Oleyl alcohol (9,10—octadecenol) (160 grams) was reacted slowly with 340 grams of propylene oxide in the presence of 4 grams of 25% sodium methoxide at 125° C. in a stainless steel autoclave. After the addition of the propylene oxide reactant, 500 grams of ethylene oxide was charged slowly to the autoclave, the contents of which were maintained at about 135° C. The pressure within the autoclave was maintained at about 100 psig (690 kPA) during the entire reaction period. Following the addition of the ethylene oxide reactant, the contents of the autoclave were stirred at 135° C. for about one hour. The reaction mixture was then neutralized with 1.5 grams of glacial acetic acid. The final product had a molecular weight of 1524 as determined by hydroxyl number (36.8). The product was analyzed using proton nuclear magnetic resonance spectroscopy, which indicated that the product contained about 7 moles of propylene oxide and 19.3 moles of ethylene oxide.

Example 26 (Comparative)

(Emulsion Polymerization Using the Surfactant of Example 25)

To a solution of 7.2 8rams of the product of Example 25 and 168.1 grams of deionized water in a 400 milliliter beaker were added with agitation vinyl acetate (171 grams) and butyl acrylate (9 grams). A stable monomer emulsion was thereby formed. A resin kettle was charged with 168.1 grams of deionized water and 1 gram of potassium persulfate and the contents of the resin kettle heated to 75° C. under nitrogen. The monomer emulsion was then charged to the resin kettle over about two hours while maintaining the temperature of the resin kettle contents at about 75°–80° C. The resulting polymer latex product was stirred at 80° C. for two additional hours and thereafter cooled to room temperature. The cooled polymer latex product was filtered through a 50 micron filtering bag, and 1.9 grams (3.8%) of coagulum (oversized polymer product) were recovered from the bag. The filtered latex contained 33.8% solids, which calculated to be about a 96.6% yield of polymer product. The mean particle size of the latex polymer product was about 610 nanometers.

A portion of a dry film prepared form the latex product was dissolved in chloroform-d and analyzed with a Bruker AN-300 Nuclear Magnetic Resonance (NMR) Spectroscope. Small multiplets at 5.35 ppm due to the double bond in the oleyl group were found.

EXAMPLE 27

The procedure of Example 26 was followed except that 7.2 grams of a polyalkoxylated allyl alcohol was used in place of the 7.2 grams of the product of Example 25. The polyalkoxylated allyl alcohol contained about 12 butoxy groups and about 25 ethoxy groups, as described in Example 1, Sample 1-B.

The polymer product produced was filtered through a 50 micron filter bag and 10.2 grams (2.0%) of coagulum (oversized polymer product) were recovered from the bag. The filtered latex contained 34.5% solids, which calculated to be about 98.7% yield of polymer product. The mean particle size of the latex polymer product was about 458 nanometers.

A portion of a dry film prepared from the latex product was dissolved in chloroform-d and analyzed with the Bruker AN-300 Nuclear Magnetic Resonance Spectroscope. No allylic protons were detected in the sample even with a 500X expansion.

EXAMPLE 28

(Contact and Angle Determination)

Equal aliquots of each of the latices prepared in Examples 26 and 27 were coated onto separate glass microscope slides and allowed to air dry overnight to form a thin clear film. A NRL Contact Angle Goniometer (Model 100-00) was employed to measure the contact angle of a drop of deionized water placed on each film with a microsyringe. The contact angle of each drop of water was measured over a period of five (5) minutes. The procedure was repeated for each film. Results are tabulated in the following Table 5.

TABLE 5

| | Contact Angle Measurements | | | |
|---|---|---|---|---|
| | Film of Example 26 | | Film of Example 27 | |
| Time (min) | Test #1 | Test #2 | Test #1 | Test #2 |
| 0 | 31 | 28 | 31 | 30 |
| 1 | 16 | 18 | 28 | 27 |
| 2 | 15 | 14 | 28 | 28 |
| 3 | 12 | 13 | 27 | 26 |
| 4 | 10 | 10 | 26 | 27 |
| 5 | 9 | 8 | 27 | 26 |

The data of Table 5 demonstrates that the drop of water placed on the film prepared with the latex of Example 26 did not hold its form but spread readily as shown by the decreasing contact angle over the observed time period. In contrast, the drop of water prepared with the latex of Example 27, i.e., the latex prepared using the surfactant of the present invention, substantially retained its form during the observed time period as shown by the relatively constant contact angles reported over the observed time period.

EXAMPLE 29

(Dialysis of Latex Products)

Into a 30 centimeter long pre-washed dialysis tube (Spectra/Por-3) were introduced 30 grams of the latex polymer product of Example 26. The dialysis tube was closed and suspended in 600 grams of deionized water for 94 hours. A 100 milliliter portion of deionized water eluant was withdrawn for surface tension determination. The same procedure was followed using the latex product of Example 27. Surface tensions were determined using a Fischer Surface Tensiomat, Model 21. Results are tabulated in Table 6.

TABLE 6

| Sample | Surface Tension, dyne/cm |
|---|---|
| Deionized Water (0.1%) | 72.0 |
| Surfactant of Example 25 (0.1%) | 39.2 |
| Eluant from Dialysis of Latex of Example 26 | 38.0 |
| Surfactant of Example 27 (0.1%) | 34.3 |
| Eluant from Dialysis of Latex of Example 27 | 60.8 |

The data of Table 6 demonstrates that the surfactant of Example 25, which was used to prepare the latex of Example 26, is apparently adsorbed onto the latex particles and not incorporated in the polymer. Consequently, during dialysis the surfactant migrates through the membrane barrier from the latex into the deionized water surrounding the dialysis tubing, as shown by the surface tension measurement of the eluant which is approximately the same as a 0.1% solution of the surfactant itself. In contrast, while a 0.1% solution of the surfactant used in the emulsion polymerization of Example 27 has a surface tension of 34.3, the eluant from the dialysis of the latex prepared in Example 27 shows only a minor reduction in surface tension compared to deionized water (60.8 versus 72.0).

Examples 25-29 demonstrate that terminally ethylenically unsaturated surfactant of the present invention performed much better than internally unsaturated materials, such as oleyl group derivatives, vis-a-vis, improving water resistivity.

Example 30

(Preparation of Allyl (6 butoxy) (12 ethoxy) sulfate, Na salt)

Allyl alcohol alkoxylate (250 grams) containing about 6 moles of butylene oxide (BO) and 12 moles of ethylene oxide (EO) [$CH_2=CH-CH_2-O-(BO)_6-(EO)_{12}-OH$] and 250 grams of methylene chloride were charged to a 3-necked one liter flask equipped with a thermometer and agitator. To this reaction mixture was added 35.5 grams of chlorosulfonic acid over 15 minutes while cooling the flask in an ice bath. Evolved HCl gas was removed by purging with nitrogen for 30 minutes. The resulting dark solution was neutralized to pH 7 with 24.3 grams of 50% sodium hydroxide while cooling the flask with cold water (Product A). Methylene chloride was removed from a small amount of the product by a Buchi Rotovapor (Product B).

EXAMPLE 31

Part A

A stable emulsion was prepared using the monomer mixture of Example 14 and 3.75 grams of Product A from Example 30. This emulsion was charged slowly to a solution of 80.5 grams of deionized water, 2.25 grams of said Product A, 1 gram of ammonium persulfate, and 0.6 grams of sodium bicarbonate at 75° C. under nitrogen atmosphere. Severe coagulation took place within two minutes causing termination of the polymerization.

Part B

The foregoing procedure was repeated without the sodium bicarbonate, but coagulation forced termination of the polymerization within five minutes.

Part C

The procedure of Part B was repeated except using the methylene chloride-free Product B of Example 30. Addition of the monomer emulsion was completed in three hours, ten minutes. The polymer product was stirred for one additional hour at 75° C., cooled to below 50° C. and filtered through a 50 micron bag into a sample bottle. The bag retained 50.9 grams of coagulum (11.4%) which was discarded. The latex product in the sample bottle comprised 42.7% by weight solids. The yield based on monomer weight was 94.8 percent.

EXAMPLE 32

(Preparation of allyl(10 butoxy) (12 ethoxy) sulfate, Na salt)

The procedure of Example 30 was followed with an allyl alcohol alkoxylate similar to that used in Example 30 except for containing about 10 moles of butylene oxide and 12 moles of ethylene oxide. Methylene chloride was removed from the product on a Buchi Rotovapor.

EXAMPLE 33

The emulsion polymerization procedure of Example 31 (Part B) was followed using the product of Example 32. Addition of the monomer emulsion was completed in 1-¾ hours. The amount of coagulum retained by the 50 micron bag was 30 grams (6.7%). The latex product in the sample bottle comprised 45.3% solids. The yield based on monomer weight was about 100%.

EXAMPLE 34

(Preparation of allyl (12 butoxy) (15 ethoxy) sulfate, Na salt)

The procedure of Example 30 was followed with an allyl alkoxylate similar to that used in Example 30 except for containing 12 moles of butylene oxide and 15 moles of ethylene oxide. Methylene chloride was removed from the product on a Buchi Rotovapor.

EXAMPLE 35

The emulsion polymerization procedure of Example 31 (Part B) was followed using the product of Example 34. Addition of the monomer emulsion was completed in 1-¾ hours. The amount of coagulum retained by the 50 micron bag was 14.1 grams (3.2%). The latex product in the sample bottle comprised 44.12% solids. The yield based on monomer weight was about 98%.

EXAMPLE 36

The procedure of Example 16 was followed using the latex products of Examples 31 (Part C), 33 and 35 and 100% cotton fabric samples. The percent shrinkage was calculated, as described in Example 16, and is tabulated in Table 7.

TABLE 7

Effects of Latex Treatments on 100% Cotton Fabric

| Latex Products | Percent Shrinkage | | | |
|---|---|---|---|---|
| | S1 | S2 | S3 | S4 |
| Deionized Water | −5 | −6.3 | 17.5 | 16.3 |
| Example 31 (Part C) | 2.5 | 1.3 | 6.3 | 7.5 |
| Example 33 | 1.3 | 3.8 | 6.3 | 5.0 |
| Example 35 | 0.0 | 1.3 | 1.3 | 1.3 |

The data of Table 7 show that the latex prepared with the polymerizable surfactant of Example 35 was most effective in reducing shrinkage compared to the latices prepared with the polymerizable surfactants of Examples 31 and 33; and that the latex prepared with the polymerizable surfactant of Example 33 was somewhat better in reducing shrinkage compared to the latex prepared with the polymerizable surfactant of Example 31 (Part C).

Although the present invention has been described with reference to specific details of certain embodiments thereof, it is not intended that such detail should be regarded as limitations upon the scope of the invention, except as and to the extent that they are included in the accompanying claims.

What is claimed is:

1. A compound represented by the following graphic formula:

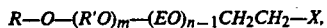

$$R-O-(R'O)_m-(EO)_{n-1}CH_2CH_2-X,$$

wherein R is selected from the group consisting of vinyl, allyl, acrylyl, acrylyl($C_1-C_{10}$)alkyl, methacrylyl, methacrylyl ($C_1-C_{10}$) alkyl, vinylphenyl and vinylphenylene ($C_1-C_6$) alkyl, R'O is the bivalent radical derived from butylene oxide, E is the bivalent ethylene radical, m is a number from about 10 to about 15, n is a number of from about 10 to about 40, the ratio of m:n being from about 1.5:1 to about 1:4, and X is selected from the group consisting of chloride, tertiaryamino, the anionic groups sulfonate, sulfate, phosphate, isethionate (and alkali metal salts of said anionic groups.

2. The compound of claim 1 wherein m is a number of from about 12 to about 15 and n is a number of from about 15 to about 35.

3. The compound of claim 2 wherein R is allyl, and X is selected from the anionic groups sulfonate, sulfate, phosphate, isethionate and sodium, potassium or ammonium salts of said anionic groups.

4. The compound of claim 2 wherein the tertiaryamino group is represented by the graphic formula, $-N^+(R_2)(R_3)R_4$, wherein $R_2$, $R_3$ and $R_4$ are each selected from the group consisting of $C_1-C_5$ alkyl and hydroxy ($C_1-C_5$)alkyl.

5. A compound of claim 1 wherein the ratio of m:n is such that the surface tension of a 0.1 weight percent aqueous solution of the compound at 25° C. is less than 38 dynes per centimeter.

6. A compound of claim 2 wherein the ratio of m:n is such that the surface tension of a 0.1 weight percent aqueous solution of the compound at 25° C. is from 30 to 35 dynes per centimeter.

7. A compound represented by the following graphic formula:

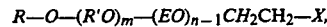

$$R-O-(R'O)_m-(EO)_{n-1}CH_2CH_2-X,$$

wherein R is selected from the group consisting of vinyl, allyl, acrylyl, acrylyl($C_1-C_{10}$)alkyl, methacrylyl, methacrylyl ($C_1-C_{10}$) alkyl, vinylphenyl and vinylphenylene ($C_1-C_6$) alkyl, R'O is the bivalent radical derived from butylene oxide, E is the bivalent ethylene radical, m is a number from about 10 to about 15, n is a number of from about 10 to about 40, the ratio of m:n being from about 1.5:1 to about 1:4 and X is selected from the group consisting of chloride, the anionic groups sulfonate and sulfate, and the alkali metal salts of such anionic groups.

8. The compound of claim 7 wherein m is a number of from about 12 to about 15 and n is a number of from about 15 to about 35.

9. The compound of claim 8 wherein R is allyl, and X is selected from the anionic groups sulfonate and sulfate, and sodium, potassium or ammonium salts of said anionic groups.

10. A compound of claim 7 wherein the ratio of m:n is such that the surface tension of a 0.1 weight percent aqueous solution of the compound at 25° C. is less than 38 dynes per centimeter.

11. A compound of claim 8 wherein the ratio of m:n is such that the surface tension of a 0.1 weight percent aqueous solution of the compound at 25° C. is from about 30 to 35 dynes per centimeter.

* * * * *